United States Patent [19]
Oguchi

[11] Patent Number: 6,039,587
[45] Date of Patent: Mar. 21, 2000

[54] IC CARD CONNECTOR DEVICE

[75] Inventor: Wataru Oguchi, Furukawa, Japan

[73] Assignee: Alps Electric Co., Ltd., Japan

[21] Appl. No.: 09/156,990

[22] Filed: Sep. 18, 1998

[30] Foreign Application Priority Data

Sep. 19, 1997 [JP] Japan .................................. 9-255393
Jan. 5, 1998 [JP] Japan ................................. 10-000342

[51] Int. Cl.[7] ............................................... H01R 13/62
[52] U.S. Cl. ...................................................... 439/159
[58] Field of Search .................................. 439/159, 160, 439/152, 153, 155, 157, 64

[56] References Cited

U.S. PATENT DOCUMENTS

| | | | |
|---|---|---|---|
| 5,383,789 | 1/1995 | Watanabe | 439/159 |
| 5,451,168 | 9/1995 | Shuey | 439/159 |
| 5,499,925 | 3/1996 | Lwee . | |
| 5,536,180 | 7/1996 | Ishida et al. | 439/159 |
| 5,653,603 | 8/1997 | Sasao et al. | 439/159 |
| 5,655,918 | 8/1997 | Soh | 439/159 |
| 5,667,396 | 9/1997 | Pan et al. | 439/160 |
| 5,683,258 | 11/1997 | Takano et al. | 439/159 |
| 5,791,920 | 8/1998 | Tomloka et al. | 439/159 |
| 5,836,775 | 11/1998 | Hiyama et al. | 439/159 |

*Primary Examiner*—Neil Abrams
*Assistant Examiner*—Chandrika Prasad
*Attorney, Agent, or Firm*—Brinks Hofer Gilson & Lione

[57] ABSTRACT

In an IC card connector device capable of holding a push rod at a push position while an IC card is connected, a heart-shaped cam groove 10 capable of holding a push rod 4 at two positions (a push position and a projecting position) in association with a transmission pin 12 is formed on the outside surface of a frame 3 having a guide groove 3a for inserting and withdrawing an IC card 1 which is formed on the inside surface thereof and a lock lever 16 is held to a knob 4a at the extreme end of the push rod 4 to thereby lock the push rod 4 at the push position by the lock lever 16 while the IC card 1 is connected. When the IC card 1 is to be discharged, the lock of the push rod 4 is released by actuating the lock lever 16 and thereafter the knob 4a is pressed to thereby move the push rod 4 from the push position to the projecting position. Then, an eject arm 5 is turned by pressing a drive plate 15 by the transmission pin 12 in the process that the push rod 4 is moved again from the projecting position to the push position to thereby discharge the IC card 1. With this arrangement, the discharge of the IC card against the operator's intention which has connected can be prohibited and the size of an eject mechanism can be reduced.

16 Claims, 7 Drawing Sheets

IC CARD CONNECTOR DEVICE

BACKGROUND OF THE INVENTION

1. Field of the Invention

The present invention relates to an IC card connector device provided with equipment which is used by inserting and withdrawing an IC card thereinto and therefrom, and more specifically, to an eject mechanism for discharging a loaded IC card.

2. Description of the Related Art

Usually, IC card connector devices are schematically arranged such that they include a pin header unit in which a multiplicity of pin contacts to be connected to socket contacts in an IC card are disposed in a housing, frames for guiding the IC card when it is inserted or withdrawn, an eject mechanism for releasing the loaded IC card from the pin contacts, and the like. There are also known IC card connector devices which include a pin housing formed integrally with frames.

Conventionally, widely employed eject mechanisms are composed of a push rod held on the outside surface of a frame so as to reciprocate in the insertion/withdrawal direction of an IC card and an eject lever turnably supported by the frame or a pin housing with an end of the eject lever engaged with the push rod. When the push rod is pushed in an IC card connector device provided with this type of the eject mechanism in the state that the IC card is loaded, since the claw portion of the eject lever which turns in association with the push rod presses the IC card toward the operator's side, the operator can simply draw out the IC card with his/her fingers. However, this arrangement has such a drawback that since the push rod projects toward the operator's side in the state that the IC card is loaded, the IC card is discharged against the operator's intention by the erroneous operation of the projecting push rod.

Whereas, the IC card connector device disclosed in Japanese Unexamined Utility Model Publication No. 6-13072 comprises first and second transmission levers which couple a push rod with a slide plate through a link, a third transmission lever which is turnably supported by the first transmission lever and engaged with and disengaged from the second transmission lever and a heart-shaped cam mechanism which can hold the push rod at a push position and a first projecting position so that the push force of the push rod can be selectively transmitted to the slide plate in accordance with a projecting amount of the push rod. That is, when an IC card is loaded, the push rod is held at the push position and the third transmission lever is not engaged with the second transmission lever. However, when the push rod is projected up to the first projecting position by the heart-shaped cam mechanism and thereafter it is further pulled to a second projecting position on the operator's side, the third transmission lever is engaged with the second transmission lever at the second projecting position. Thus, when the push rod is pressed in the direction of the push position in this state, the press force is transmitted to the slide plate through the respective transmission levers so that the slide plate presses the IC card to the operator's side. Therefore, the IC card can be prevented from being discharged against the operator's intention in such a manner that the push rod is held at the push position while the IC card is connected and projected up to the push position only when the IC card is discharged.

As described above, according to the IC card connector device disclosed in the above publication, since the push rod is held at the push position while the IC card is connected and projected only when the IC card is discharged, the IC card can be prevented from being discharged against the operator's intention. Further, when the push rod is erroneously projected regardless of that the operator does not desire to discharge the IC card, the push rod can be held at the push position again without discharging the IC card by pushing the push rod from the first projecting position without pulling out it up to the second projecting position, whereby the operability of eject operation can be improved.

However, there is a problem that since the three transmission levers coupled with each other through the link are interposed between the push rod and the slide plate and the press force of the push rod is transmitted to or shut off from the slide plate in accordance with the attitude of the respective transmission levers, a large space is necessary to turn the respective transmission levers and the miniaturization of the IC card connector device is prevented by it. Since the respective transmission levers must be inevitably disposed to the top surface or bottom surface of an IC card insertion port because of the above reasons, and in particular, since a plurality of sets of the respective transmission levers must be disposed in a vertically piled state by securing a sufficient space in an IC card connector device which permits at least two IC cards to be inserted thereinto and withdrawn therefrom, there is caused a problem that the size of the IC card connector device is increased in a height direction. Further, the IC card connector device has a problem that eject operation is troublesome because it requires to perform operation three times in ordinary eject operation, that is, operation for projecting the push rod held at the push position up to the first projecting position, operation for pulling out the push rod located at the first projecting position up to the second projecting position and operation for pushing the push rod projected to the second projecting position to the push position. Further, there still remains a problem that when the push rod is erroneously projected up to the second projecting position, the IC card is discharged against the operator's intention.

SUMMARY OF THE INVENTION

The present invention is arranged such that check means is provided with a push rod capable of reciprocating between a push position and a projecting position for locking the push rod at the push position or releasing the lock of the push rod. After the push rod is projected from the push position to the projecting position by releasing the lock thereof, an IC card is discharged in the process that the push rod is moved from the projecting position to the push position again. With this operation, when it is not desired to discharge the IC card which has been inserted, the discharge operation of the IC card is prohibited by locking the push rod at the push position by the check means. Thus, a drawback that the IC card is discharged against the operator's intention can be overcome.

An IC card connector device of the present invention is arranged such that it includes frames for supporting an IC card so that it can be inserted and withdrawn and a push rod capable of reciprocating between a push position and a projecting position, in which when the IC card is inserted, the push rod is located at the push position, the push rod is moved to the projecting position in this state by the first push motion of the push rod and the IC card is discharged by the second push motion of the push rod executed at this projecting position and the IC card connector device comprises check means for locking the movement of the push rod or releasing the lock of the push rod at the push position of the push rod. With this arrangement, when it is not desired to discharge the IC card which has been inserted, the discharge operation of the IC card is prohibited by locking the push rod at the push position by the check means. Thus, a drawback that the IC card is discharged against the operator's intention can be overcome.

When there are provided a transmission pin capable of holding the push rod at the two positions or the push position and the projecting position and a heart-shaped cam mechanism composed of a heart-shaped cam groove and the push rod is locked at the push position by the check means, it can be prevented that the IC card is discharged against the operator's intention. On the other hand, since a transmission pin is caused to trace a heart-shaped cam groove in one direction by the first push motion of the push rod in the state that the lock of the push rod is released by the check means at the push position and can reciprocate between the push position and the projecting position, the IC card which has been inserted can be discharged by the second push motion of the push rod from the projecting position to the push position. Further, since the eject mechanism can be intensively disposed to the outside surface of the frame and the push rod, the size of the eject mechanism can be reduced and, in particular, it can be preferably applied to an IC card connector device corresponding to a plurality of IC cards.

Any check means may be used as the above check means so long as it can selectively permit the first push motion of the push rod and the check means may be mounted to the side of, for example, a personal computer main body or the like where the IC card connector device is attached.

The check means can lock the push rod or release the lock thereof when it is manually actuated. When the check means is arranged to automatically lock the push rod at the time it is pushed, the check means can more securely prevent the erroneous discharge of the IC card.

The check means can be composed of a lock lever which is slid or turned, and when the lock lever is attached to the push rod at the time, the check means can be integrally arranged with the push rod and the size thereof can be reduced. In particular, when a knob is attached to the push rod and the lock lever is disposed in the knob, operability of the check means can be improved when it performs locking and lock releasing operations.

DESCRIPTION OF THE PREFERRED EMBODIMENTS

Figure 1:
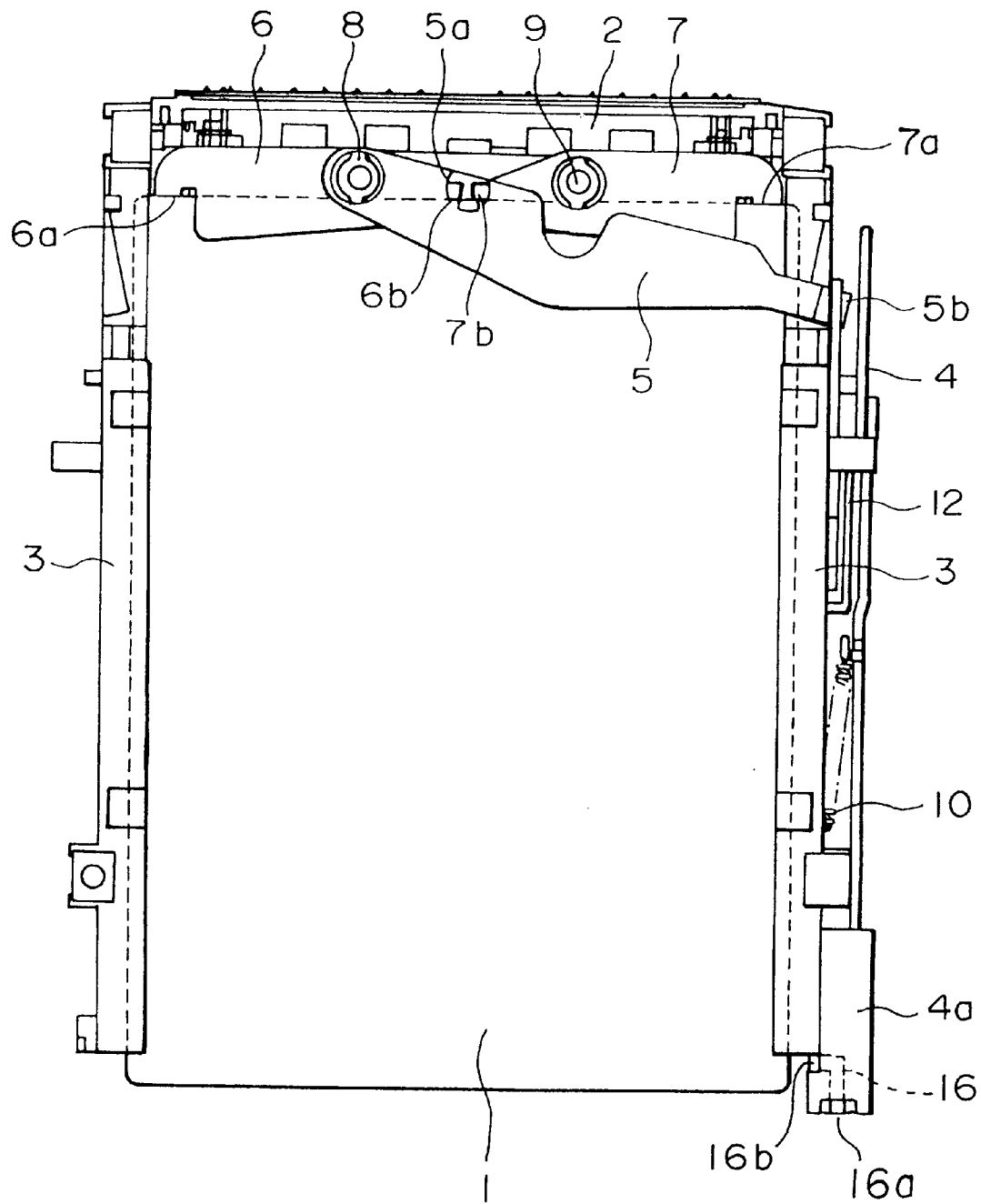
FIG. 1 is a plan view showing the state that an IC card is loaded on an IC card connector device according to an embodiment of the present invention.
Figure 3:
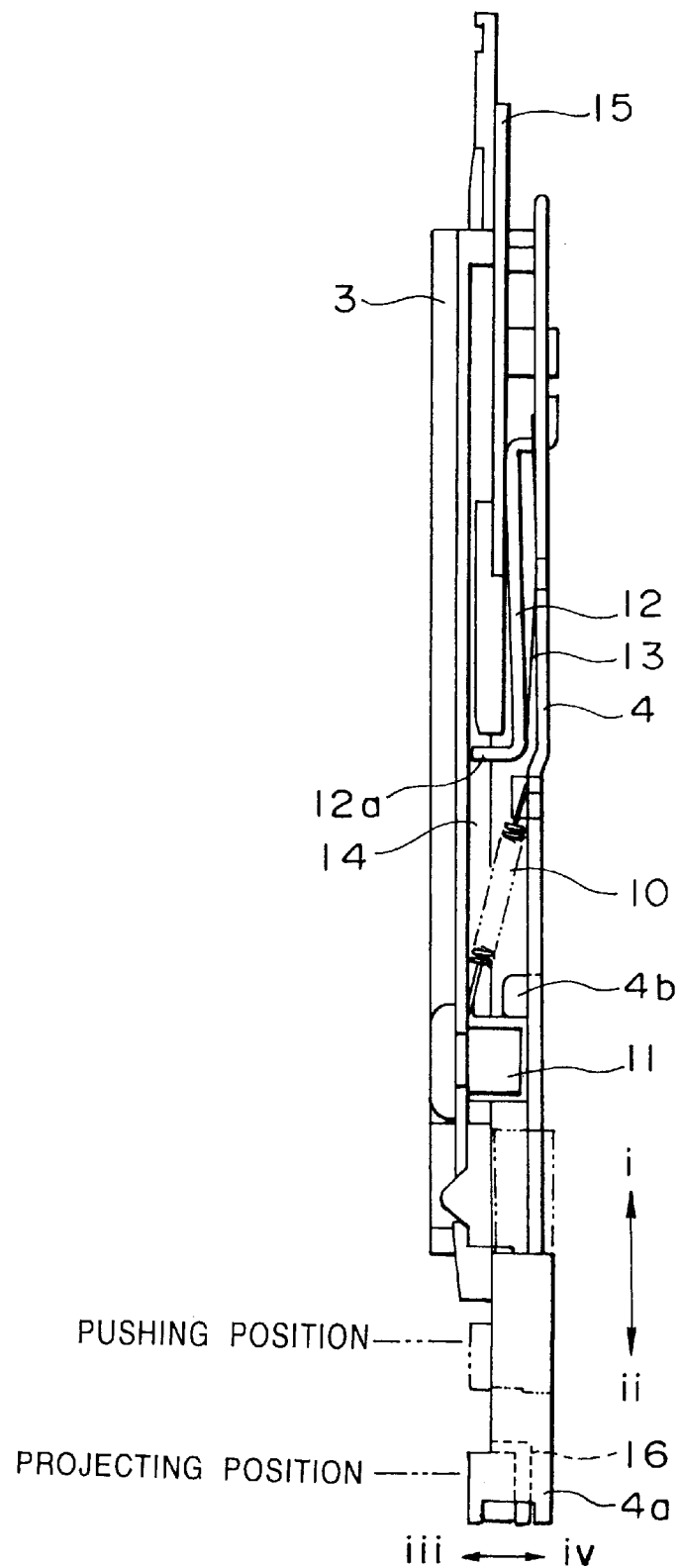
FIG. 3 is a plan view of an ejection mechanism provided with the connector device.
Figure 4:
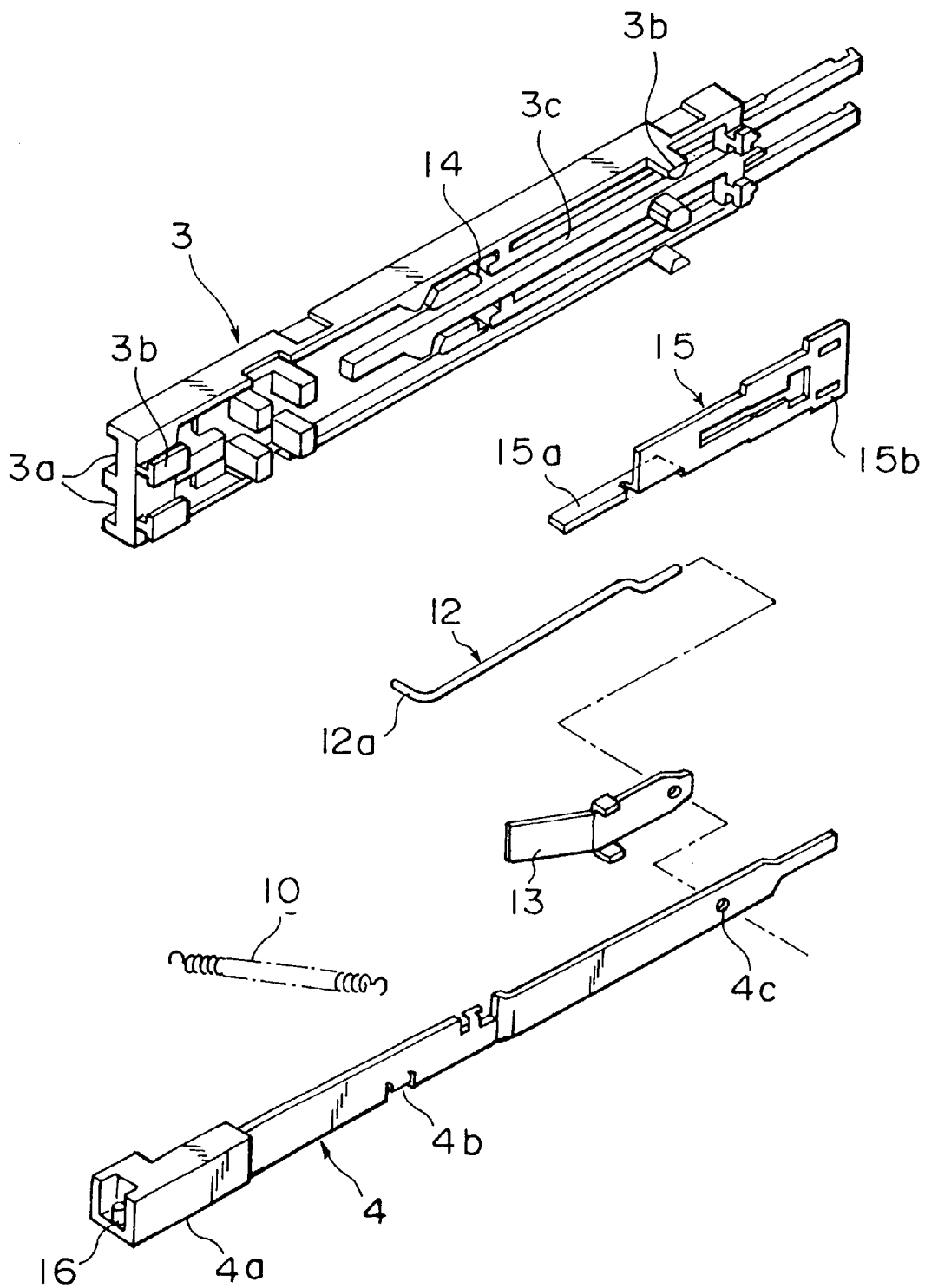
FIG. 4 is an exploded perspective view of the eject mechanism.
Figure 5:
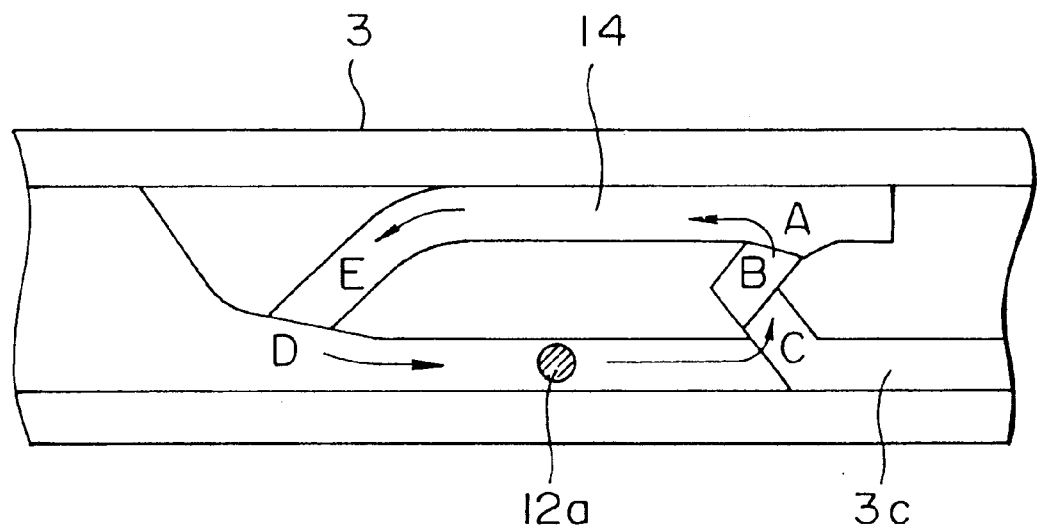
FIG. 5 is a view describing a heart-shaped cam groove.
Figure 6:
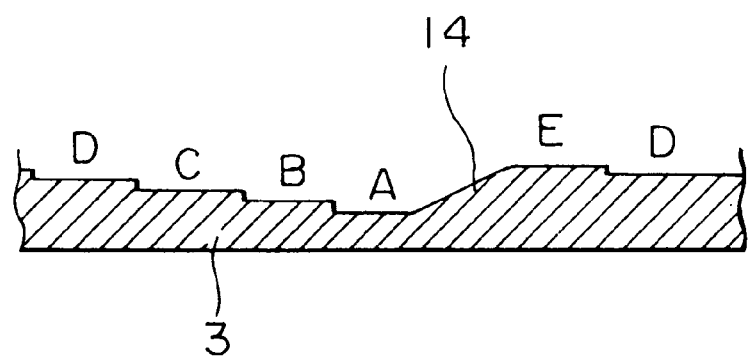
FIG. 6 is an folded view showing the cam surfaces of the heart-shaped cam groove.
Figure 7:
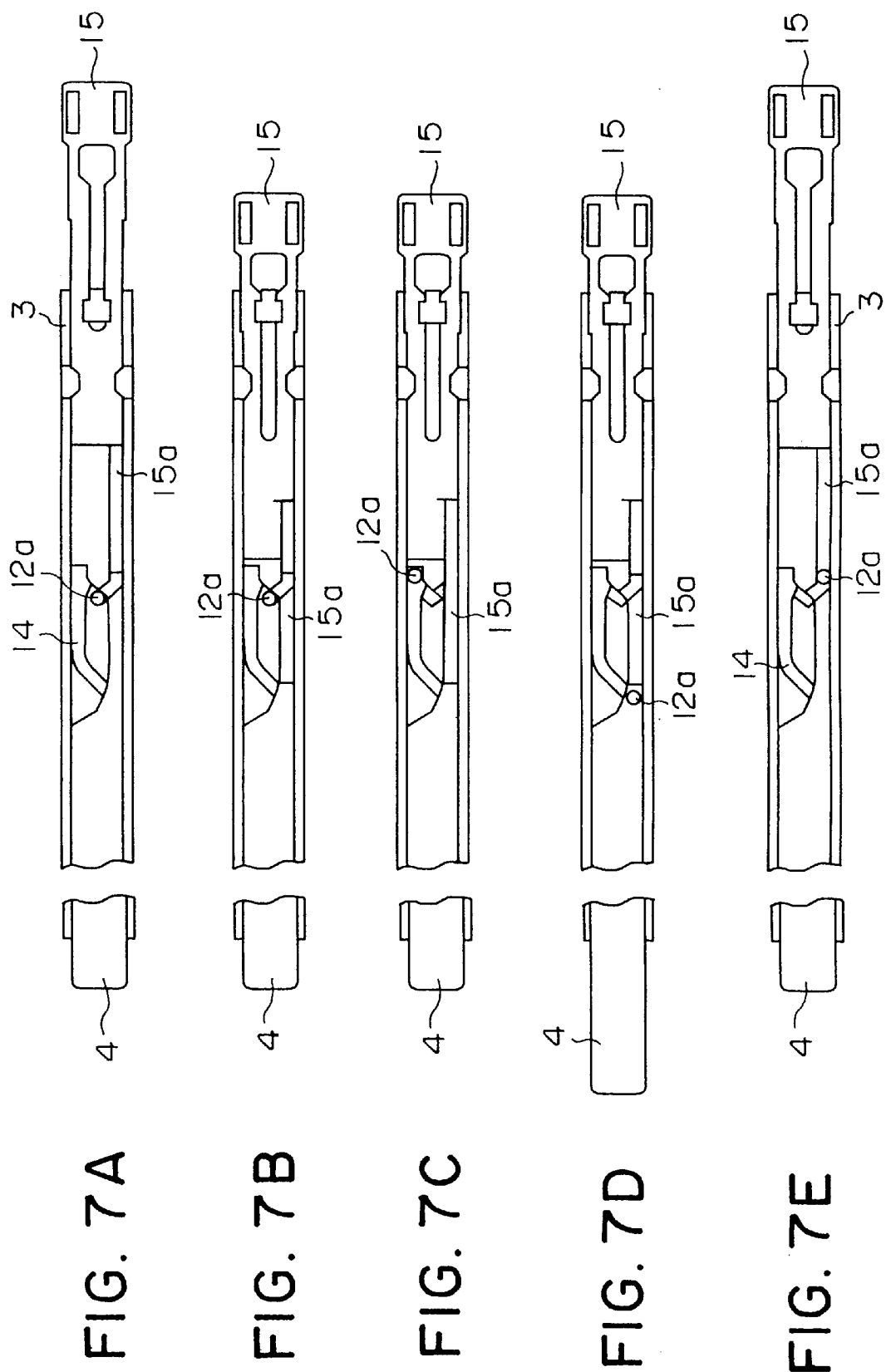
FIGS. 7A–7E are views describing an operation of the eject mechanism of FIG. 3.

An embodiment will be described with reference to drawings. FIG. 1 is a plan view showing the state that an IC card is loaded on an IC card connector device according to an embodiment of the present invention, FIG. 2 is a plan view showing the state that the IC card is removed from the connector device, FIG. 3 is a plan view of an eject mechanism, FIG. 4 is an exploded perspective view of the eject mechanism, FIG. 5 is a view describing a heart-shaped cam groove, FIG. 6 is an folded view showing the cam surfaces of the heart-shaped cam groove, and FIG. 7 is a view describing an operation of the eject mechanism.

Figure 2:
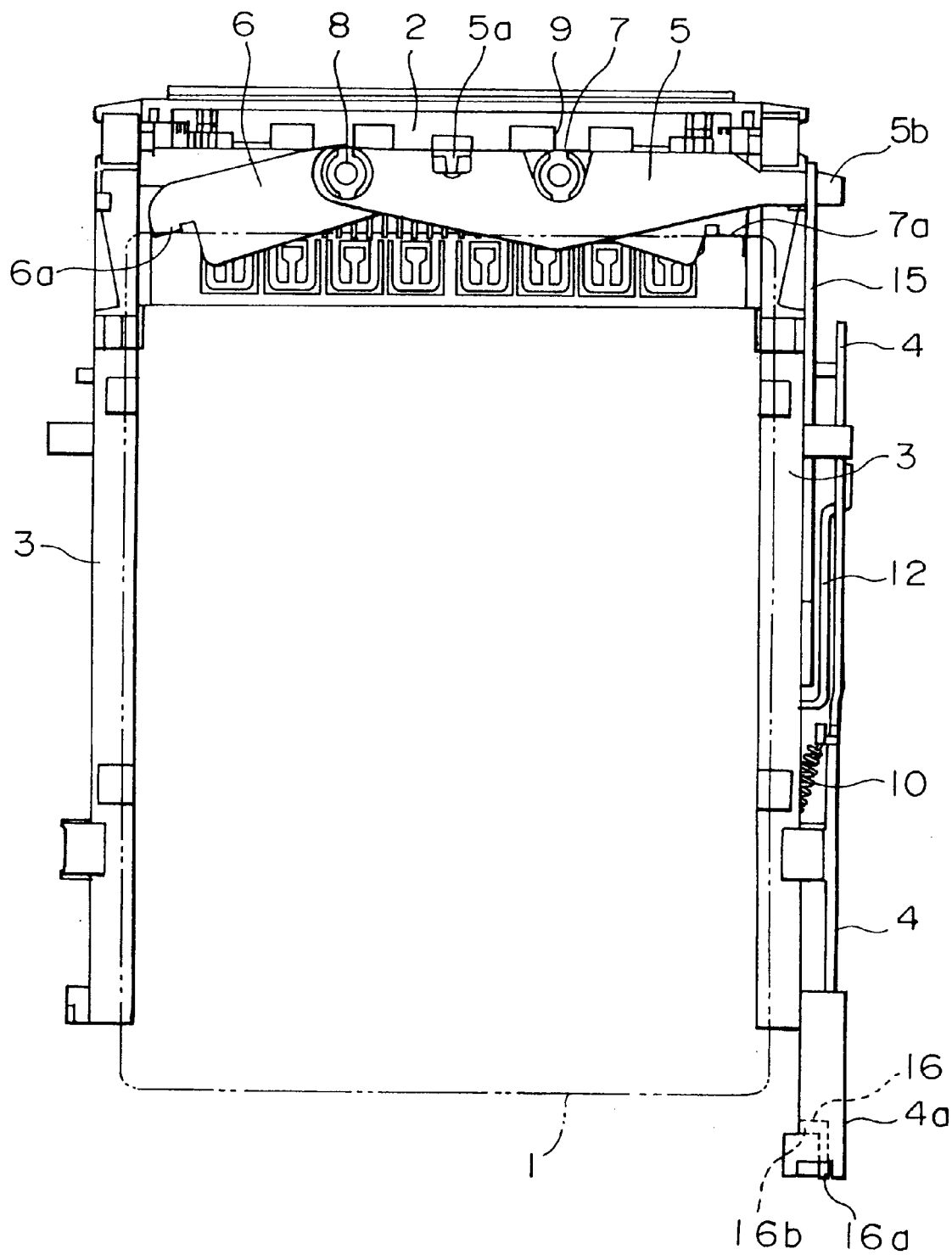
FIG. 2 is a plan view showing the state that the IC card is removed from the connector device.

As shown in FIG. 1 and FIG. 2, the IC card connector device according to the embodiment mainly comprises a pin housing 2 to which a multiplicity of pin contacts (none of them are shown) are inserted under pressure and fixed in a predetermined arrangement so that the socket contacts in an IC card 1 are connected thereto, a pair of frames 3 fixed to both the right and left sides of the pin housing 2 for guiding the IC card 1 from both the sides in the width direction thereof when it is inserted or withdrawn, a push rod 4 attached to one of the frames 3, an eject arm 5 turnably supported by the pin housing 2, first and second turning arms 6, 7 and the like and an eject mechanism which will be described later is interposed between the push rod 4 and the eject arm 5.

A first support shaft 8 and a second support shaft 9 are provided with the pin housing 2 with a specific interval defined therebetween and an end of the eject arm 5 is turnably supported by the first support shaft 8. A coupling hole 5a and an engaging portion 5b are formed to the eject arm 5 and the engaging portion 5b projects to the outside of the frame 3. The first turning arm 6 is also turnably supported by the first support shaft 8 and a claw piece 6a for pushing out the IC card 1 and a tongue piece 6b projecting into the coupling hole 5a of the eject arm 5 are formed to the first turning arm 6. The second turning arm 7 is turnably supported by the second support shaft 9 and a claw piece 7a for pushing out the IC card 1 and a tongue piece 7b projecting into the coupling hole 5a of the eject arm 5 are formed to the second turning arm 7.

The arrangement of the eject mechanism will be described below in detail based on FIG. 3 to FIG. 6. The IC card connector device shown in the embodiment, which can be loaded with the two IC cards 1 along the upper and lower two-level guide grooves 3a formed to the inside surfaces of both the frames 3, is provided with the two push rods 4 for discharging both the IC cards 1. However, since both the push rods 4 have fundamentally the same function and arrangement, one of the push rods 4 and the eject mechanism thereof will be described below. (FIG. 4 shows only one of the eject mechanisms.)

The push rod 4 has a knob 4a at an end and is held so that it can be reciprocated by a projection 3b disposed to the outside surface of one of the frames 3 in the direction where the IC card 1 is inserted and withdrawn (the directions of arrows i, ii in FIG. 3). A lock lever 16 as check means is held in the knob 4a so that it can slide in the directions of arrows iii, iv in FIG. 3. The lock lever 16 is formed to an L-shape and a one end 16a is exposed to the front surface of the knob 4a. Although the push rod 4 is always urged in the direction where the IC card 1 is inserted and withdrawn (the direction of the arrow ii of FIG. 3) by a coil spring 10, an amount of movement of the push rod 4 in the direction is regulated to a projecting position of FIG. 3 by a stopper piece 4b which is abutted against a mounting fitting 11 secured to the frame 3. A transmission pin 12 having an L-shaped actuating portion 12a at an extreme end is swingably supported by the hole 4c of the push rod 4 at the other end and urged in the direction of the outside surface of the frame 3 by a leaf spring 13 locked to the push rod 4.

A heart-shaped cam groove 14 is engraved to the outside surface of the frame 3 and the actuating portion 12a of the transmission pin 12 is engaged with the cam groove 14. As shown in FIG. 5 and FIG. 6, the cam groove 14 has a plurality of cam surfaces A to E having a different height and the actuating portion 12a of the transmission pin 12 traces the cam surfaces A to E in the direction of arrows in FIG. 5. A drive plate 15 is held on the outside surface of the frame 3 so that it can reciprocate along the direction where the IC card 1 is inserted and withdrawn and a receiving portion 15a formed by being bent from the drive plate 15 is inserted into a slot 3c engraved to the outside surface of the frame 3. The slot 3c linearly continues to the cam surface D of the cam groove 14 and the receiving portion 15a of the drive plate 15 reciprocates between the slot 3c and the cam surface D. Further, an engaging hole 15b is formed to the drive plate 15 and the engaging portion 5b of the eject arm 5 passes through the frame 3 and is engaged with the engaging hole 15b of the drive plate 15.

When the connector device arranged as described above is not loaded with the IC card 1, the push rod 4 is pushed in the direction of the arrow i of FIG. 3 and held at a push position in the drawing. At the time, the actuating portion 12a of the transmission pin 12 is locked to the cam surface B of the cam groove 14 as shown in FIG. 7A and the push rod 4 is stably held at the push position by the tensile strength of the coil spring 10 and the transmission pin 12 locked to the cam surface B.

When the IC card 1 is being inserted along the guide groove 3a of the frame 3, the IC card 1 moving toward the pin housing 2 causes the pin contacts of the pin housing 2 to be inserted into the socket contacts thereof under pressure while pushing the claw pieces 6a, 7a of the first and second turning arms 6, 7. Thus, the insertion of the IC card 1 in a specific amount finishes the loading thereof with the secure connection of the IC card 1 to the respective contact pins (refer to FIG. 1). At the time, since the first turning arm 6 and the second turning arm 7 turn in an opposite direction each other using the first support shaft 8 and the second support shaft 9 as their axis of turn, respectively and the turn of the turning arms 6, 7 is transmitted to the eject arm 5 through the portion where the tongue pieces 6b, 7b are coupled with the coupling hole 5a, the eject arm 5 turns using the first support shaft 8 as its axis of turn and the drive plate 15 moves toward the operator's side of the frame 3 in association with the turn. With this operation, although the receiving portion 15a of the drive plate 15 moves from the slot 3c to the cam surface D of the cam groove 14 as shown in FIG. 7B, since the actuating portion 12a of the transmission pin 12 is locked to the cam surface B, the receiving portion 15a is not abutted against the actuating portion 12a. Thus, the push rod 4 is maintained in the state that it is held at the push position while the IC card 1 is connected.

When the IC card 1 is to be maintained in its loaded state after it is loaded, the one end 16a of the lock lever 16 exposed to the front surface of the knob 4a is slid in the direction of the arrow iii in FIG. 3 and the other end 16b of the lock lever 16 is projected from a side of the knob 4a. As a result, the other end 16b of the lock lever 16 enters between the front surface of the frame 3 and the rear surface of the knob 4a as shown in FIG. 1 and locks the push rod 4 so that it cannot be further pushed from the push position. Thus, even if the knob 4a is erroneously pressed, the push rod 4 is not moved and the IC card 1 is maintained in the connected state.

On the other hand, when the IC card 1 is to be discharged from the connector device, first, the one end 16a of the lock lever 16 is slid from the position of the arrow iii in the direction of the arrow iv and the other end 16b of the lock lever 16 is retracted into the knob 4a. Since the lock lever 16 is released from the locked state by the operation, when the knob 4a is pushed in the direction of the arrow i of FIG. 3, the push rod 4 is further moved forward from the push position. As a result, since the actuating portion 12a of the transmission pin 12 is moved from the cam surface B of the cam groove 14 to the cam surface A and from the cam surface A to the cam surface D through the cam surface E by the tensile strength of the coil spring 10 as shown in FIG. 7C, the push rod 4 is moved in the direction of the arrow ii of FIG. 3 as shown in FIG. 7D and projected to the projecting position as shown in FIG. 2. The actuating portion 12a of the transmission pin 12 is not abutted against the receiving portion 15a of the drive plate 15 also at the time. Thus, when the push rod 4 is moved to the projecting position, the actuating portion 12a confronts the receiving portion 15a on the cam surface D.

When the knob 4a of the push rod 4 is pushed again in the direction of the arrow i of FIG. 3 after it is projected up to the projecting position as described above, above the actuating portion 12a of the transmission pin 12 is moved from the cam surface D through the cam surface C as shown in FIG. 7E, and is locked to the cam surface B of the groove 14. The push rod 4 is held at the push position again. At the time, since the actuating portion 12a of the transmission pin 12 is abutted against the receiving portion 15a of the drive plate 15 and presses it in the process that the actuating portion 12a moves to the cam surface D, the eject arm 5 engaged with the drive plate 15 is turned and the claw pieces 6a, 7a of the first and second turning arms 6, 7 press both the ends of the front surface of the IC card 1 approximately linearly in a separating direction in accordance with the turn of the eject arm 5. Therefore, the socket contacts of the IC card 1 inserted into the contact pins of the pin housing 2 under pressure are released therefrom as shown by a two-dot-and-dash-line in FIG. 2. Consequently, the IC card 1 can be simply discharged from the IC card connector device by pulling out it while taking the operator's side thereof with fingers.

Figure 8:
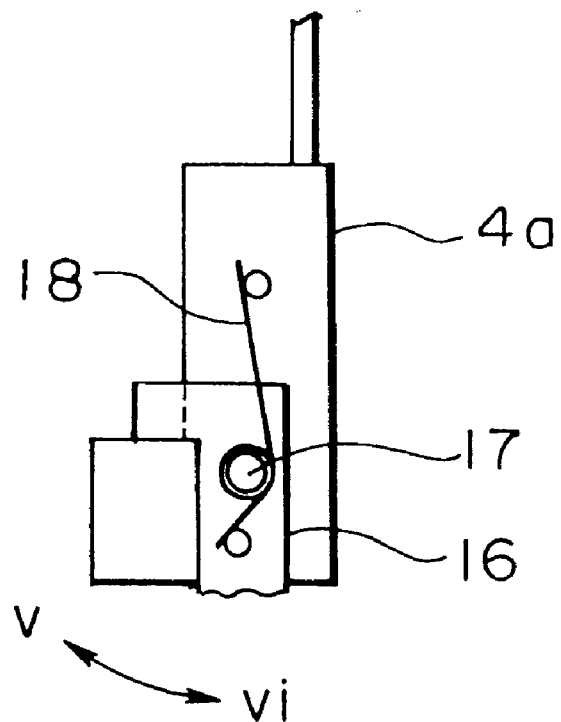
FIG. 8 is a view describing a modification of a lock lever.

In an embodiment shown in FIG. 8, a lock lever 16 is held by a the knob 4a so that it is turned in the directions of arrows v, vi about a support shaft 17 and the lock lever 16 executes a turning motion in place of a sliding motion. The lock lever 16 is always elastically urged in a locking direction (the direction of the arrow vi) and the locked state thereof is released only when it is turned in the direction of the arrow v against the elastic urging force of a spring 18. Since the employment of the above arrangement permits the push rod 4 to be automatically locked at the push position without the need of especially actuating the lock lever 16, the IC card 1 can be more securely prevented from being erroneously discharged. This arrangement may be applied to the lock lever 16 which executes the sliding motion.

Although the connector device on which two IC cards can be loaded are exemplified and described in the above respective embodiments, the present invention is also applicable to a connector device on which one or three or more IC cards can be loaded likewise.

The present invention executed in the above embodiments can achieve the following advantages.

The check means for locking the movement of the push rod or releasing the lock of the push rod at the push position of the push rod is provided with the IC card connector device which includes the frames for supporting an IC card so that it can be inserted and withdrawn and the push rod capable of reciprocating between the push position and the projecting position and in which when the IC card is inserted, the push rod is located at the push position, the push rod is moved to the projecting position in this state by the first push motion of the push rod and the IC card is discharged by the second push motion of the push rod executed at this projecting position. As a result, when it is not desired to discharge the IC card which has been inserted, the discharge operation of the IC card is prohibited by locking the push rod at the push position by the check means, whereby the drawback that the IC card is discharged against the operator's intention can be overcome.

When the transmission pin capable of holding the push rod at the two positions (the push position and the projecting position) and the heart-shaped cam mechanism composed of the heart-shaped cam groove are provided and the push rod is locked at the push position by the check means, the discharge of the IC card against the operator's intention can be prevented. Since the transmission pin is caused to trace the heart-shaped cam groove in one direction by the first push motion of the push rod in the state that locking motion performed by the check means at the push position is released to thereby permit the push rod to reciprocate between the push position and the projecting position, the IC card which has been inserted can be discharged by the second push motion of the push rod from the projecting position to the push position. Further, since the eject mechanism can be intensively disposed to the outside surface of the frame and the push rod, the size of the eject mechanism can be reduced and, in particular, it can be preferably applied to an IC card connector device corresponding to a plurality of IC cards.

In addition, when the check means is arranged to automatically lock the push rod at the time it is pushed, the check means can more securely prevent the erroneously discharge of the IC card.

The check means can be composed of a lock lever which is slid or turned, and when the lock lever is attached to the push rod at the time, the check means can be integrally arranged with the push rod and the size of them can be reduced as a whole. In particular, when the knob is attached to the push rod and the lock lever is disposed in the knob, operability of the check means when it performs locking and lock releasing operations can be improved.

What is claimed is:

1. An IC card connector device comprising a frame for supporting an IC card so that it can be inserted and withdrawn, a push rod capable of reciprocating between a push position and a projecting position, and check means for locking the movement of the push rod and releasing the push rod at the push position of the push rod; wherein when the IC card is inserted, the push rod is located at the push position, said movement of the push rod at the push position being locked by said check means, the push rod is moved to the projecting position by releasing said check means and thereafter by a first push motion of the push rod, and the IC card is discharged by a second push motion of the push rod executed at this projecting position.

2. An IC card connector device according to claim 1, further comprising a transmission pin capable of holding the push rod at the push position and the projecting position and a heart-shaped cam mechanism composed of a heart-shaped cam groove.

3. An IC card connector device according to claim 1, wherein said check means is manually actuated to lock the push rod and release the push rod.

4. An IC card connector device according to claim 1, wherein said check means is automatically actuated when the push rod is pushed to thereby lock the push rod at the push position.

5. An IC card connector device according to claim 1, wherein said check means is composed of a lock lever which is slid.

6. An IC card connector device according to claim 1, wherein said check means is composed of a lock lever which is turned.

7. An IC card connector device according to claim 5, wherein said lock lever is attached to the push rod.

8. An IC card connector device according to claim 6, wherein said lock lever is attached to the push rod.

9. An IC card connector device according to claim 7, wherein a knob is attached to the push rod and said lock lever is disposed in said knob.

10. An IC card connector device according to claim 2, wherein said check means is manually actuated to lock the push rod and release the push rod.

11. An IC card connector device according to claim 2, wherein said check means is automatically actuated when the push rod is pushed to thereby lock the push rod at the push position.

12. An IC card connector device according to claim 2, wherein said check means is composed of a lock lever which is slid.

13. An IC card connector device according to claim 2, wherein said check means is composed of a lock lever which is turned.

14. An IC card connector device according to claim 11, wherein said lock lever is attached to the push rod.

15. An IC card connector device according to claims 11 or 12, wherein said lock lever is attached to the push rod.

16. An IC card connector device according to claim 13, wherein a knob is attached to the push rod and said lock lever is disposed in said knob.

* * * * *